Figure 1:
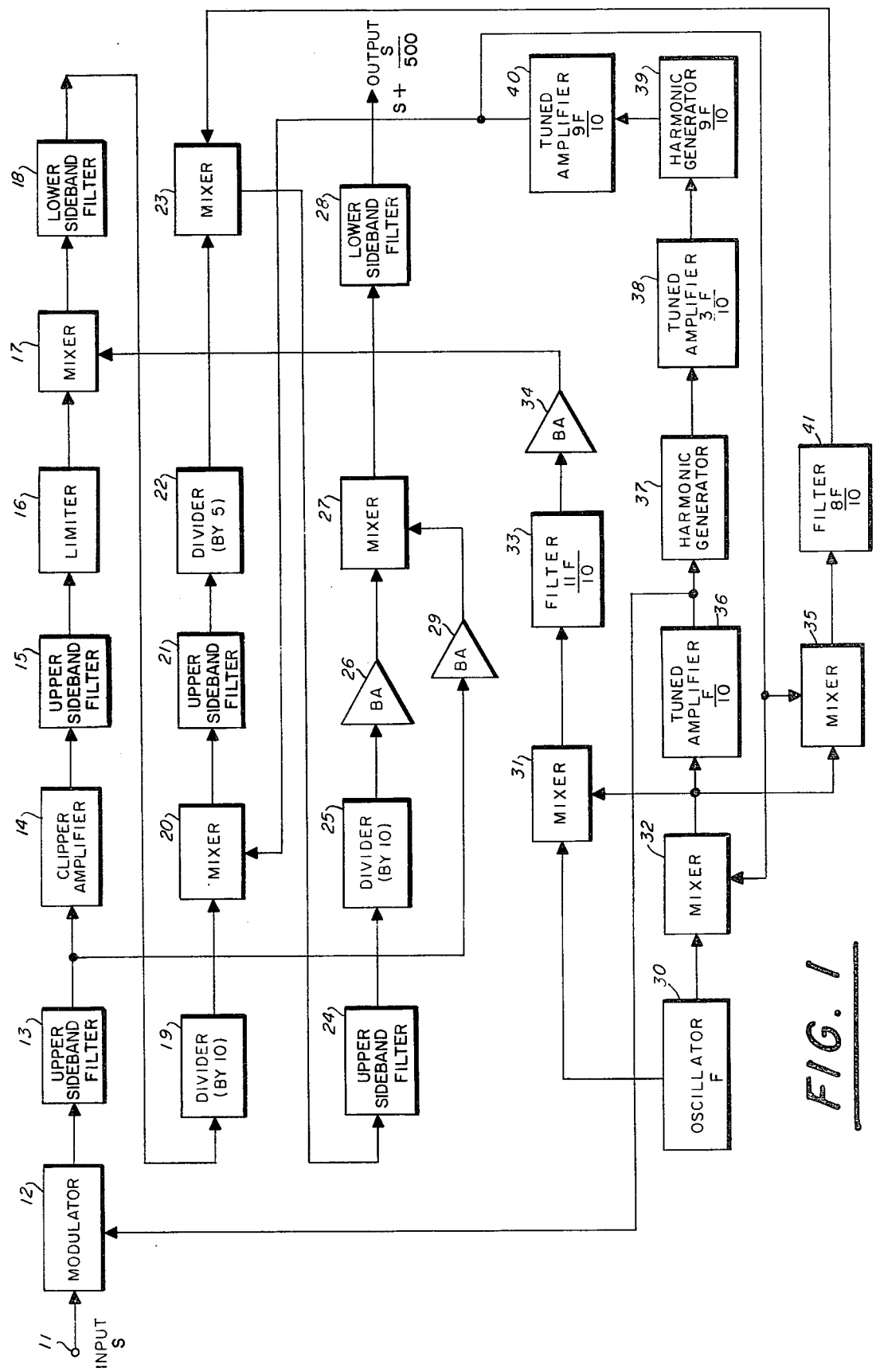

United States Patent [19]
Papineau

[11] 4,194,167
[45] Mar. 18, 1980

[54] UP-DOPPLER SIMULATOR

[75] Inventor: Milton D. Papineau, Kailua Hi.

[73] Assignee: The United States of America as represented by the Secretary of the Navy, Washington, D.C.

[21] Appl. No.: 250,991

[22] Filed: Jan. 10, 1963

[51] Int. Cl.² .............................................. H03F 3/14
[52] U.S. Cl. .................................... 331/38; 343/16 B; 367/1; 367/2
[58] Field of Search ...................... 331/37, 38; 340/16; 343/18

[56] References Cited

U.S. PATENT DOCUMENTS

| 2,581,594 | 1/1952 | MacSorley | 331/38 |
| 2,892,944 | 6/1959 | Wo | 331/37 |

Primary Examiner—Nelson Moskowitz
Attorney, Agent, or Firm—Louis A. Miller; Paul N. Critchlow; Don D. Doty

EXEMPLARY CLAIM

1. Means for up-Dopplerizing an input signal comprising in combination,
   means for generating a predetermined F frequency signal,
   means effectively connected to said predetermined F frequency signal generating means for producing an F/10 frequency signal, an 8F/10 frequency signal, a 9F/10 frequency signal, and an 11F/10 frequency signal,
   means connected to said F/10 frequency signal producing means for heterodyning an input S frequency signal with said F/10 frequency signal for producing an F/10+S frequency signal,
   means effectively coupled to said last mentioned heterodyning means and said 11F/10 frequency signal producing means for producing an F−S frequency signal,
   means effectively coupled to said F−S frequency signal producing means and said 9F/10 frequency signal generating means for producing an F−S/10 frequency signal,
   means effectively coupled to said F−S/10 frequency signal producing means and said 8F/10 frequency signal generating means for producing an F/10−S/500 frequency signal,
   and means effectively connected to said F/10−S/500 frequency signal producing means and the aforementioned F/10+S frequency signal producing means for producing an S+S/500 frequency signal.

19 Claims, 4 Drawing Figures

UP-DOPPLER SIMULATOR

The invention described herein may be manufactured and used by or for the Government of the United States of America for governmental purposes without the payment of any royalties thereon or therefor.

The present invention relates generally to acoustical target simulators used for decoying the enemy during naval and military operations and, in particular, is a method and means for artificially simulating up-Doppler in a stationary decoy that is submerged in sea water during anti-submarine warfare in order to make it appear that it is approaching an enemy vessel when, in fact, it is moored at some predetermined fixed position.

Since a motionless target usually has little or no attraction to an enemy echo-search vessel, one of the prime requisites of decoying action is the actual or apparent motion of the device acting as a decoy.

In the past, moving expendable decoys were used in an attempt to confuse an enemy vessel, and for many practical purposes, such decoys and their operations have proven and still prove to be highly satisfactory. However, they also have some disadvantages which make them unsuitable or at least undesirable for some operational circumstances. For example, in order to make them effectively moveable, power and propulsion systems are required; difficult and time-consuming monitoring procedures are required if optimum effect is to be obtained therefrom; ordinarily, in many instances, the classification of a moving decoy is more easily accomplished by an enemy sonar search; and moving decoys are complex and expensive to manufacture, maintain, and operate.

The present invention overcomes most of these objectionable features due to the fact that it performs its decoying function while it is incorporated in a moored stationary buoy or some other appropriate stationary housing means suitable for being located under water.

It is, therefore, an object of this invention to provide an improved sonar decoy system.

Another object of this invention is to provide a method and means for simulating up-Doppler signals with a stationary target.

Still another object of this invention is to provide a sonar type decoy which will be difficult to classify as such by an enemy sonar search system.

A further object of this invention is to provide an improved Doppler simulator which produces a true percentage of the received frequency Doppler over a broadband width of two or more octaves.

A further object of this invention is to provide a simple system for artificially simulating Doppler signals without the attendance of another tending vessel in the vicinity thereof.

Another object of this invention is to provide a Doppler simulator which operates in a highly deceptive manner.

Another object of this invention is to provide a method and means for producing a false Doppler for a stationary target that operates in the one to five kilocycle per second band.

Still another object of the subject invention is to provide a method and means for producing a relatively low Doppler rate, which is desirable in order to cause the target to appear in the detection zone for a longer period of time.

Another object of this invention is to provide a method and means for producing a stationary false target which presents a slow apparent speed to an enemy search sonar system, thereby making the actual detection of geographical movement or lack thereof exceedingly difficult.

A still further object of this invention is to provide a method and means for producing realistic Doppler signals which will confuse even the more sophisticated active sonar systems.

A further object of this invention is to provide a method and means for electronically developing a true percentage Doppler of a received frequency signal over a broad band.

Another object of this invention is to provide an up-Doppler simulator which preserves the amplitude characteristics of the input signal received thereby over a forty db dynamic range.

Still another object of this invention is to provide a decoy up-Doppler simulator having an output signal amplitude that is proportional to the input signal amplitude.

Still another object of the subject invention is to provide a decoy which will require considerable investigation by an enemy to disprove that it is an actual submarine boat.

Still another object of the subject invention is to provide a Doppler simulator that may be easily monitored and retrieved.

And another object of the subject invention is to provide an artificial Doppler simulator that is more easily and economically manufactured, maintained, and operated.

Figure 2:
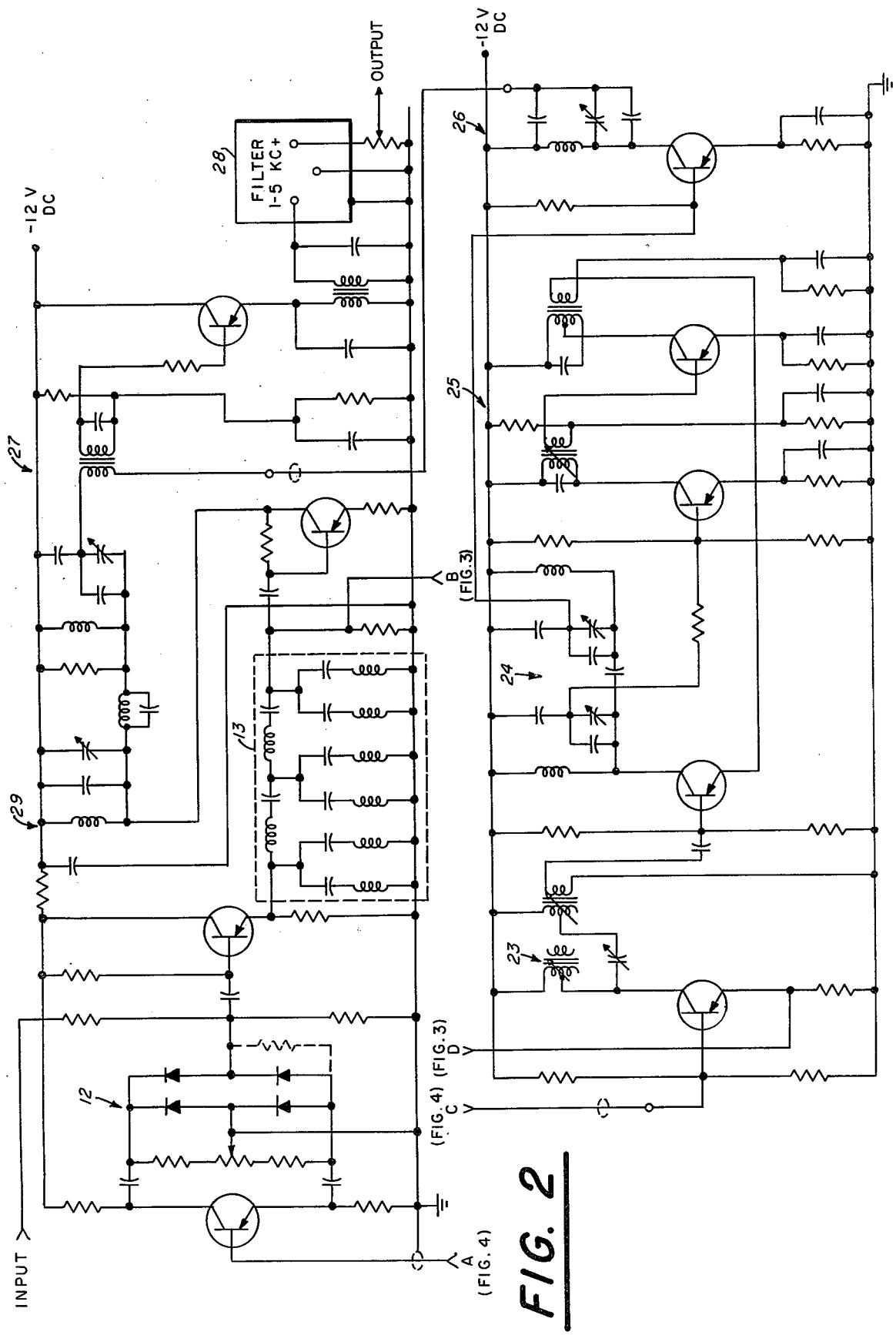
Figure 3:
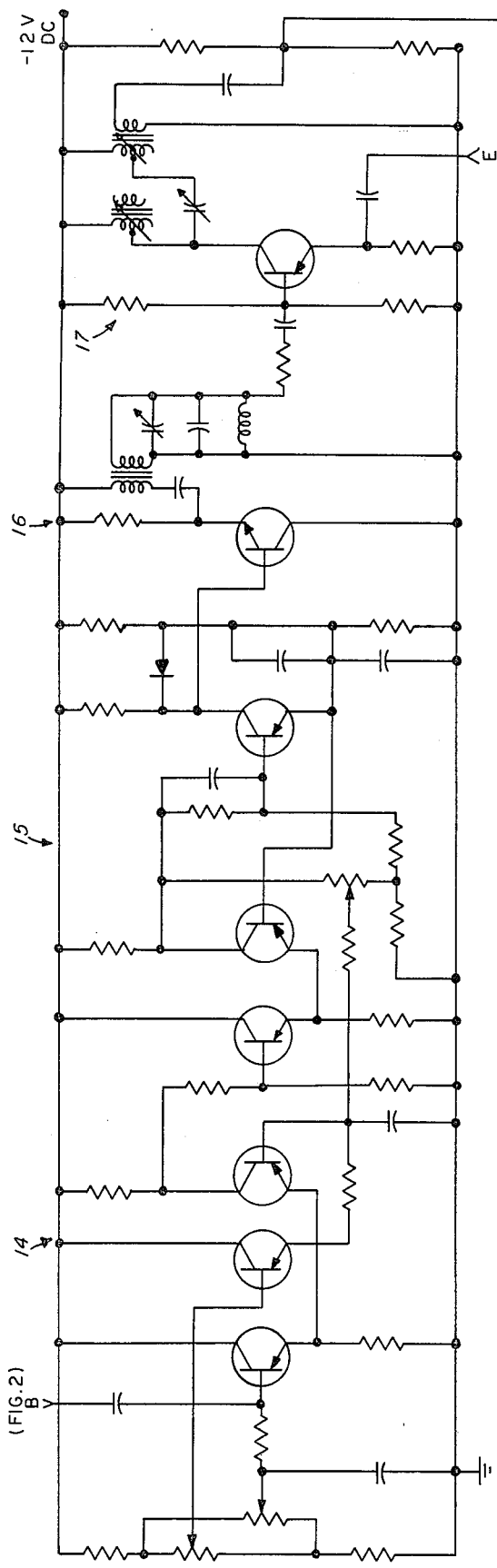
Figure 3:
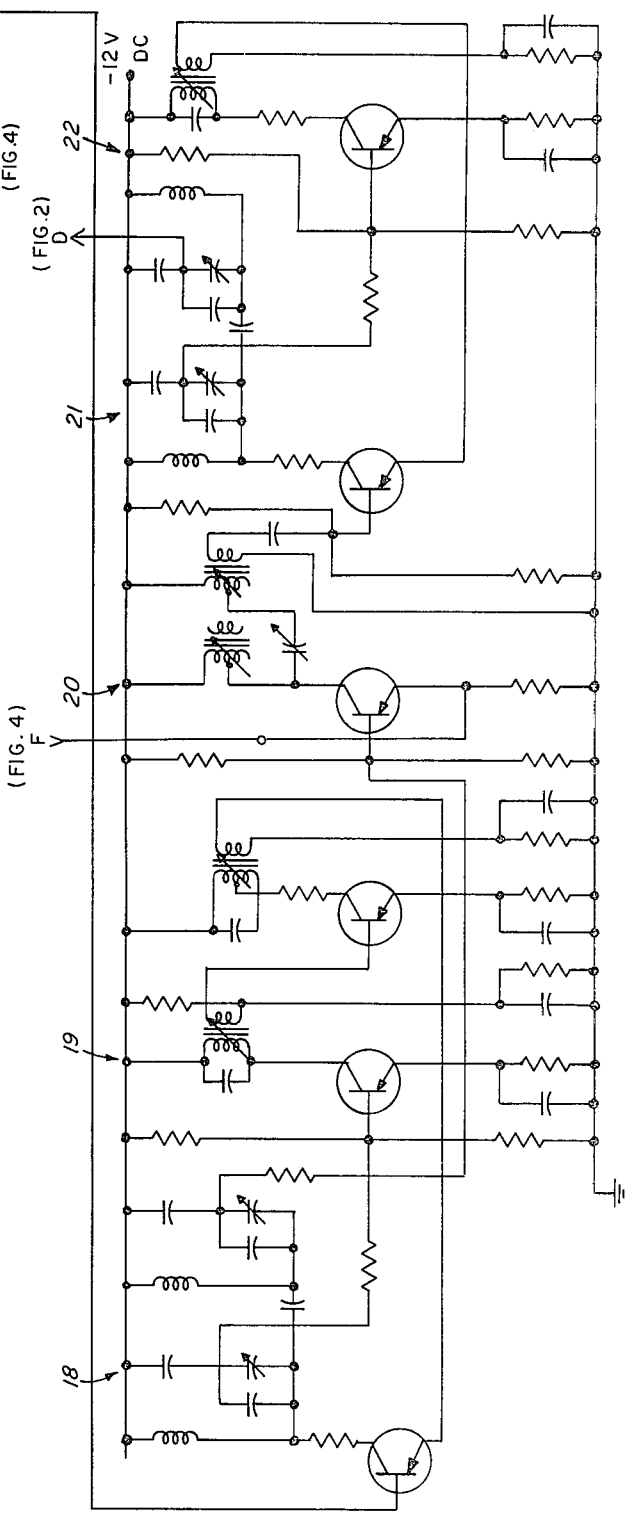
Figure 4:
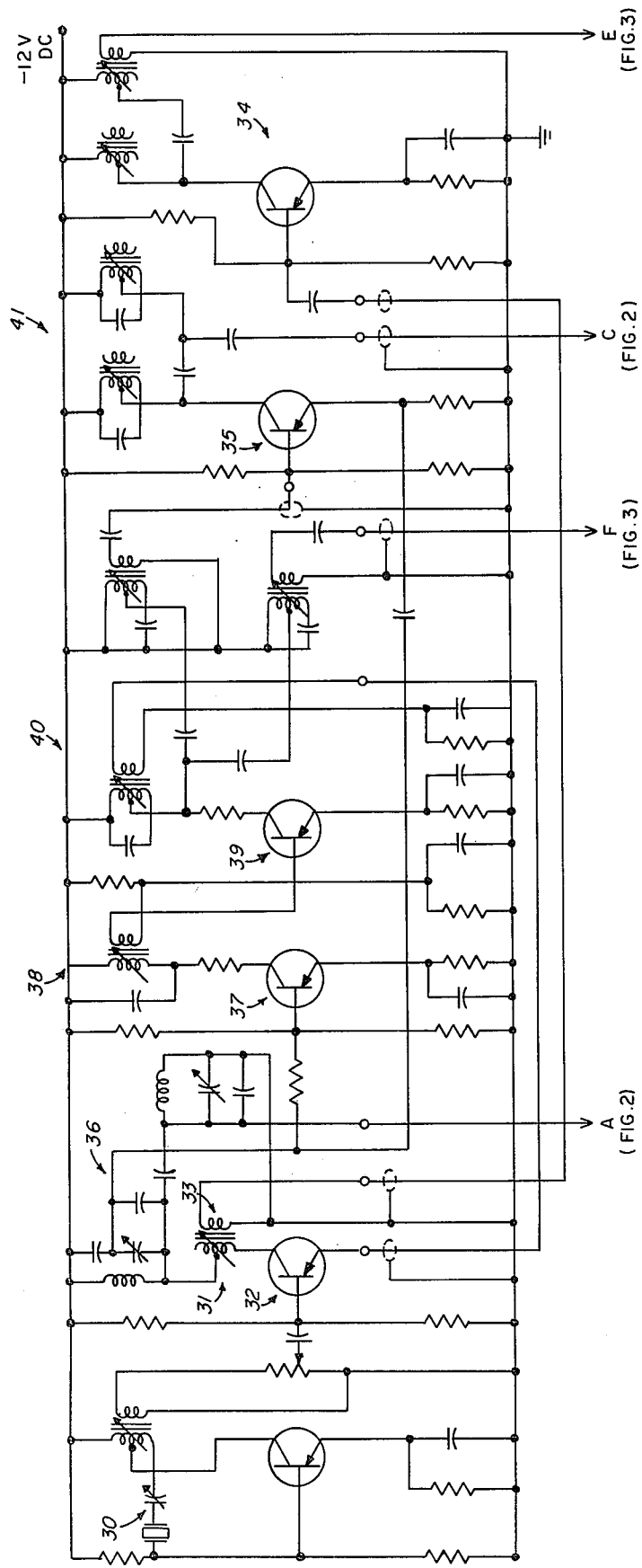

Other objects and many of the attendant advantages of this invention will be readily appreciated as the same becomes better understood by reference to the following detailed description when considered in conjunction with the accompanying drawing in which like reference numerals designate like parts throughout the figures thereof and wherein:

FIG. 1 is a block diagram representation of a preferred embodiment of the subject invention;

FIGS. 2 through 4 combine to depict a detailed schematic representation of the device depicted in block form in FIG. 1.

Referring now to the drawing there is shown in FIGS. 1 through 4 an input signal terminal 11 connected to a modulator 12 which may be of the balanced or other suitable type. The output of modulator 12 is coupled through an upper side band filter 13, a clipper amplifier 14, a filter 15, and a limiter 16, the output of which is coupled to one of the inputs of a mixer 17. The output of mixer 17 is then coupled through another filter 18 and a frequency divider by 10 circuit 19 to one of the inputs of another mixer 20. The output of mixer 20 is fed through filter 21 and a frequency divider by five circuit 22 to one of the inputs of another mixer 23. The output of mixer 23 is then applied through a filter 24, a frequency divider by 10 circuit 25, and a buffer amplifier 26 to one end of the inputs of still another mixer 27, the output of which is filtered by a filter 28 before becoming the output signal from the subject invention. The output from filter 13, which is actually the filtered output of modulator 12, is also applied through a buffer amplifier 29 to the other of the inputs of the aforesaid mixer 27.

An oscillator 30 supplies output signals at the rate of F cycles per second and these signals are applied to one of the inputs of a mixer 31 and also to one of the inputs of another mixer 32, simultaneously. The output of mixer 31 is applied to a filter 33 that is adapted to filter out all frequencies except that frequency which equals 11F/10. The output of filter 33 is then applied to a buffer amplifier 34, the output of which is coupled to the other input of the aforesaid mixer 17. The output of mixer 32 is also applied as one of the inputs to the aforesaid mixer 31, as well as to another mixer 35 and a tuned amplifier 36, which is tuned to pass only those signals having a frequency equal to F/10. The output of tuned amplifier 36 takes two paths, one of which is to the other input of the aforesaid balanced modulator 12 and the other of which is supplied to the input of a harmonic generator 37. Tuned amplifier 38, which is tuned for passage of signals having a frequency equal to 3F/10, is coupled to the output of harmonic generator 37, and the output of tuned amplifier 38, in turn, is connected through another harmonic generator 39 that is adapted for producing signals having a frequency equal to 9F/10. These signals are supplied to a tuned amplifier 40 which is tuned for passage of signals having a frequency equal to 9F/10 only. The output of tuned amplifier 40 likewise takes three paths, one of which is supplied to the other input of the aforesaid mixer 20, the second of which is supplied to the other input of the aforesaid mixer 32, and the third of which supplies an input to mixer 35. The output of the aforesaid mentioned 35 is coupled through a filter 41 having a pass frequency of 8F/10 and, in turn, the output thereof is then coupled as the other input of the aforesaid mixer 23.

Although there are obviously a number of different conventional circuits which may be defined and used in accordance with the components shown in block form in FIG. 1, the comparable preferred schematic circuitry thereof is shown in detail in order to disclose the subject invention exactly as it has been built and used by the U.S. Navy. Because it would be well within the purview of one skilled in the art to make the transition from the various and sundry blocks of the block diagram of FIG. 1 to the equivalent circuitry thereof respectively shown in the schematic diagram of FIGS. 2 through 4 it is not deemed necessary that the structure of the device of FIGS. 2 through 4 include further elaboration in order for the artisan to understand it sufficiently to make and use the subject invention therefrom if so desired. Accordingly, the aforegoing description of the subject invention pertains to the devices of FIGS. 1 through 4 and such procedure has been used in order to simplify said disclosure in this patent application.

It should be understood that each of the components represented in block form in FIG. 1 are well known and conventional per se and that it is their unique arrangement, interconnections, and inter-actions that produce the resulting device which constitutes this invention and the new and useful results effected thereby.

Briefly the operation of the present invention is discussed now in conjunction with FIG. 1. As previously mentioned, the instant Doppler simulator is incorporated in any buoy or housing adapted for being submerged within fresh water, sea water, or any other environmental medium in which its operation will be desirable. In combination with the subject device, of course, is some suitable means for supplying an input signal thereto within the 1 to 5 kilocycle per second frequency range, the exact frequency of which is designed according to the operational circumstances involved. Hence the supplier of the input signal (S) may be an ordinary sonar receiver system which receives the search pings from the enemy sonar that is echo-ranging thereon. After appropriate processing within the receiver portion of said sonar, the ping signals within 1 to 5 kilocycles per second frequency range are supplied thereby as the input of the subject invention. After these signals have been Dopplerized in a manner which will be explained further below, they are then supplied to any appropriate transmitting device which in turn causes them to be broadcast throughout the environmental medium, that is, for example, the ambient sea water, back to the enemy sonar system. However, it should be understood that the subject invention is also suitable as a device using other signal mediums if appropriate receiving and transmitting transducers are employed. When received thereby, said enemy sonar system and its human operator are deceived in such manner as to cause them to erroneously discern that the subject decoy is approaching them with a range change rate of approximately three knots per hour. Accordingly, the closing time between the subject invention and the enemy vessel appears to the enemy vessel to be much faster than it actually is, because the enemy vessel receives the up-Dopplerized signals therefrom which, of course, gives the decoy an appearance of movement, rather than appearing to be located in a static position. In event countermeasures are employed by said enemy vessel as a warfare tactic, in all probability a missile, torpedo, or other destructive device of some sort would be used. But, because the decoy has the appearance of movement, the aiming of any countermeasure missile or torpedo would probably be aimed in error and, thus, not accomplish its destructive mission. Moreover, because considerable time would have to be used and considerable exploratory tests would have to be made in order to determine that the subject decoy was only just that instead of an actual submarine or some other approaching underwater vessel, its actual stationary status may not be discovered until it is too late to be of an advantage from a tactical standpoint, thereby reducing the effectiveness of the enemy vessel against the decoy or any other friendly vessels engaging in combat therewith.

Speaking in general, the study of sonars operating in the 1 to 5 kilocycles per second frequency band, the optimum operational band of the subject invention, indicates that a relatively low Doppler rate is desirable so that the target will appear in the detection zone for a longer period of time. In particular, with respect to this invention, because the false target is actually stationary, the presentation of a slow apparent speed makes the actual detection of geographic movement or, more accurately, the actual lack thereof considerably more difficult. Because enemy sonars are known to have at least a 1/10th knot Doppler capability coupled to a wideband signal, such as frequency modulated signals or pseudo-random noise, a percentage frequency change substantially comparable to a 3 knot up-Doppler frequency was chosen as the most probably optimum frequency of the signal to be transmitted as the apparent reflected echo signal from the target decoy back to the enemy sonar system. This, of course, provides a vast improvement over sonars or countermeasure decoys transmitting apparent echo signals that have been Dopplerized by a fixed number of cycles. This is true because Dopplerizing an apparent target signal with an additional number of fixed cycles results in a varying percentage Doppler which in wideband high resolution active sonar systems would appear as a target with several Doppler notes and, thus, identify itself as being a false target. Inasmuch as the method and means of this invention will develop a true percentage Doppler over a bandwidth up to two or more octaves, it presents a realistic Doppler to any sophisticated active sonar systems pinging thereon and, therefore, constitutes a considerably more efficient countermeasure device.

A 0.2 percent frequency shift is equal to a 3 knot Doppler, regardless of the signal frequency involved. When converted to a fraction, 0.2 per cent equals 1/500 and, thus, if 1/500 of the signal frequency involved is added thereto, the resulting signal will be up-Dopplerized within 3 knots of the original signal. The subject system operates to electronically accomplish this in the following manner:

A system for generating a number of signals having predetermined ratios with a given control signal is generated as the signals which are to be used to operate upon the received ping from the enemy sonar system. In this instance, these signals are effected by use of a crystal controlled reference oscillator 30, having a basic control frequency F from which said various multiple and submultiple frequencies are derived. For the purpose of simplifying this explanation, it can be said that frequency F is processed through mixer 32 and tuned amplifier 36 which extracts the F/10 frequency therefrom after which this F/10 frequency is supplied to harmonic generator 37 which converts it into a 3F/10 frequencies signal. This, in turn, is applied to tuned amplifier 38 to insure that the output of the signal therefrom is a pure 3F/10 harmonic of the original output of the F/10 tuned amplifier. Another harmonic generator 39 extracts the 9F/10 harmonic from the 3F/10 signal from the last mentioned tuned amplifier and, it, too, is processed through another tuned amplifier 40 to insure a pure 9F/10 output signal therefrom. This 9F/10 becomes the input for the aforementioned mixer 32. This particular subsystem is known in the art as a regenerative frequency divider (divide by 10 in this case). Its inherent 9F/10 is used as well as its normal F/10 output. Also this 9F/10 frequency signal is the signal which is mixed with the F frequency signal from oscillator 30 in the aforesaid mixer 32. Said 9F/10 frequency signal is also mixed in mixer 35 along with the output from the mixer 32 to produce an 8F/10 frequency signal which is filtered by filter 41 in order to insure the purity of said 8F/10 frequency. The outputs of oscillator 30 and mixer 32 are likewise mixed in mixer 31, and when the output therefrom is appropriately filtered by an 11F/10 filter the output therefrom is also a pure 11F/10 frequency signal.

Hence it can be seen that an F/10 frequency signal, an 8F/10 frequency signal, a 9F/10 frequency signal, and an 11F/10 frequency signal are all effectively generated from the original F frequency signal of oscillator 30. Although preferable, it should be noted here that precise control of reference oscillator 30 is not absolutely necessary, inasmuch as the lack thereof would not ordinarily be adversely detected by an enemy sonar system within the normal operational time of naval combat tactics and inasmuch as the frequency F is only used as a carrier frequency and means of operating on signal S; it, thus, being introduced and then eliminated within the invention itself.

For the purpose of this invention, the foregoing F/10, 8F/10, 9F/10, and 11F/10 signals should be considered as the necessary, predetermined control signals which are applied to the remainder of the invention in order to effect the desired Dopplerizing of the input signal at the 0.2 percent figure. Considering now the operation of the processing portion of the subject invention, if an input signal S is applied to modulator 12 along with the F/10 signal from tuned amplifier 36 the output from modulator 12 will be both of said frequencies along with their sum and difference frequencies. When the upper side band thereof is extracted by means of filter 13, the resulting output signal therefrom becomes F/10+S. This signal is then appropriately shaped by clipper amplifier 14 and upper sideband filter 15 and limiter 16 to insure that it is a pure signal; tht is, a signal not containing any undesirable harmonics, and a signal from which essentially all amplitude variations have been eliminated. This F/10+S signal is then hetrodyned with the aforementioned 11F/10 signal from buffer amplifier 34 to provide an F−S signal, which is likewise filtered by lower sideband filter 18 for purification purposes. When divided by 10 in divider 19, this signal becomes F/10−S/10, the signal which is applied is one of the inputs of mixer 20 for hetrodyning with the 9F/10 signal output from tuned amplifier 40. The hetrodyning therein, of course, produces both of the input signals along with their sum and difference frequencies and when these are filtered by filter 21 which extracts the upper side band therefrom, the resulting signal becomes F−S/10. This signal is in turn divided by 5 in divider 22 to become (2F/10)−(S,/50), the signal which is then applied as one of the inputs to mixer 23 to be hetrodyned with the other input 8F/10 from filter 41 in order to produce the F−S/50 signal. Actually, the output of mixer 23 includes both of the basic frequencies plus their sum and difference frequencies; however, when filtered by upper side band filter 24 all frequencies except the F−S/50 are deleted therefrom. This signal is then divided by ten again in divider 25 to become (F/10)−(S/500). For isolation purposes, buffer amplifier 26 is used here and the aforesaid (F/10)−(S/500) signal is passed through it to one of the inputs of mixer 27 in order to be hetrodyned with the aforementioned F/10+S signal which, of course, was the output of filter 13. Before being applied to the other input of mixer 27, the output of filter 13 was passed through another buffer amplifier 29 merely for circuit isolation purposes in order to prevent any distortion or adverse inter-action between the two circuits involved. The output of mixer 27 like all of the preceding mixers also contain the two basic input signals plus their sum and difference frequencies, one of which is the S+S/500 signal which, of course, is the desired output signal. Hence, after filtering in a lower sideband or appropriate bandpass filter 28, the pure S+S/500 frequency signals is supplied as the output therefrom and this output signal obviously constitutes the Dopplerized input signal which has been Dopplerized to the extent of a 0.2 percent increase in frequency.

Mathematically the foregoing operation may be expressed as follows:

Let $S$ = input $$\frac{F}{10} + S = \frac{F}{10} + \frac{10S}{10} = \frac{F + 10S}{10}$$

$$\frac{11F}{10} - \frac{F + 10S}{10} = F - S$$

-continued
$$F - S \div 10 = \frac{F}{10} - \frac{S}{10}$$

$$\frac{F}{10} - \frac{S}{10} + \frac{9F}{10} = F - \frac{S}{10}$$

$$F - \frac{S}{10} \div 5 = \frac{2F}{10} - \frac{S}{50}$$

$$\frac{2F}{10} - \frac{S}{50} + \frac{8F}{10} = F - \frac{S}{50}$$

$$F - \frac{S}{50} \div 10 = \left(\frac{F}{10} - \frac{S}{500}\right)$$

$$\frac{F}{10} + S - \left(\frac{F}{10} - \frac{S}{500}\right) = S + \frac{S}{500} = \text{output}$$

Inasmuch as the above S+S/500 signal has a frequency which is greater than the input S signal, it can readily be seen that it has been up-Dopplerized to the extent of 0.2 percent. Since this 0.2 percent increase in frequency is equivelant to 3 knots, it can then also be seen that the original input signal S has been up-Dopplarized by 3 knots, and if any such signal is broadcast back to an enemy sonar system as a result of the enemy's sonar system pinging upon the subject invention, it will give the appearance of the decoy approaching the enemy vessel at the rate of 3 knots per hour. This, of course, provides the aforementioned deceptive tactics which are so valuable during naval or other combat operations.

For many practical purposes, the following control signal frequencies have been found to be highly satisfactory to produce the Dopplerizing and an input signal within the 1 to 5 kilocycle per second frequency range:

F=455,000 cycles per second
F/10=45,500 cycles per second
3F/10=136,500 cycles per second
8F/10=364,000 cycles per second
9F/10=409,500 cycles per second
11F/10=500,500 cycles per second As can readily be seen, the F frequency, the output frequency of oscillator 30, is considerably higher than the 1 to 5 kilocycles per second input signal S. Although not absolutely necessary, using a high frequency F oscillator signal relative to the frequency of input signal S is preferable in order to avoid slow response times and large circuit components. Moreover, such ratio of frequencies permits sharper timing for eliminating unwanted frequencies. Obviously, the foregoing frequencies are the respective outputs of the various components of the control signal generator, and these are the signals which are applied to the Dopplerizing circuit for appropriate processing therein to effect the S+S/500 output signal.

Using an F frequency of 455,000 mentioned above results in the following respective, exemplary operating frequencies for input signals of 1,000, 3,000, and 5,000 cycles per second:

| Operation | Operating Frequencies | | |
|---|---|---|---|
| | S = 1Kc | S = 3Kc | S = 5Kc |
| $\frac{F}{10} + S$ | 46,500 | 48,500 | 50,000 |
| F − S | 454,000 | 452,000 | 450,000 |

-continued

| Operation | Operating Frequencies | | |
|---|---|---|---|
| | S = 1Kc | S = 3Kc | S = 5Kc |
| $\frac{F}{10} - \frac{S}{10}$ | 45,400 | 45,200 | 45,000 |
| $F - \frac{S}{10}$ | 454,900 | 454,700 | 454,500 |
| $\frac{2F}{10} - \frac{S}{50}$ | 90,980 | 90,940 | 90,900 |
| $F - \frac{S}{50}$ | 454,980 | 454,940 | 454,900 |
| $\frac{F}{10} - \frac{S}{500}$ | 45,498 | 45,494 | 45,490 |
| Doppler in cycles/sec. | 2 | 6 | 10 |

Again, it should be understood that the foregoing frequencies are merely representative and that the instant invention is not intended to be limited thereto, since it would be well within the purview of one skilled in the art to design the individual components thereof for satisfactorily processing other S and F frequency signals, should operational circumstances so warrent.

Thus, it can be seen that when an input signal S is applied to the subject invention as a result of it receiving an echo ranging, echo-search pulse from an enemy sonar system, that it will develop an S+S/500 frequency signal that appears for all practical purposes to be the original input S signal that has been Dopplerized as a result of movement of the encasing vessel, and this is the signal which is transmitted back to the enemy vessel for the purpose of effecting confusion and tactical error thereat during naval combat operations.

Obviously many modifications and variations of the present invention are possible in the light of the above teachings. It is, therefore, to be understood, that within the scope of the appended claims, the invention may be practiced otherwise than specifically described.

What is claimed is:

1. Means for up-Dopplerizing an input signal comprising in combination,
   means for generating a predetermined F frequency signal,
   means effectively connected to said predetermined F frequency signal generating means for producing an F/10 frequency signal, an 8F/10 frequency signal, a 9F/10 frequency signal, and an 11F/10 frequency signal,
   means connected to said F/10 frequency signal producing means for heterodyning an input S frequency signal with said F/10 frequency signal for producing an F/10+S frequency signal,
   means effectively coupled to said last mentioned heterodyning means and said 11F/10 frequency signal producing means for producing an F−S frequency signal,
   means effectively coupled to said F−S frequency signal producing means and said 9F/10 frequency signal generating means for producing an F−S/10 frequency signal,
   means effectively coupled to said F−S/10 frequency signal producing means and said 8F/10 frequency signal generating means for producing an F/10−S/500 frequency signal,
   and means effectively connected to said F/10−S/500 frequency signal producing means and the aforementioned F/10+S frequency signal producing means for producing an S+S/500 frequency signal.

2. The device of claim 1 wherein said means for generating a predetermined F frequency signal comprises an oscillator.

3. The device of claim 1 wherein said means effectively connected to said predetermined F frequency signal generating means for producing an F/10 frequency signal, an 8F/10 frequency signal, a 9F/10 frequency signal, and an 11F/10 frequency signal comprises, first means having a pair of inputs and an output for mixing a pair of signals with one of the inputs thereof coupled to the output of said F frequency signal producing means, second means having a pair of inputs and an output for mixing a pair of signals with one of the inputs thereof coupled to the output of said first signal mixing means and the other input thereof coupled to the output of the aforesaid F frequency signal producing means, third means having a pair of inputs and an output for mixing a pair of signals with one of the inputs thereof coupled to the output of said first signal mixing means, means connected to the output of said first signal mixing means for passing and amplifying the F/10 signals emanating therefrom, means coupled to the output of said F/10 signal passing and amplifying means for generating 3F/10 frequency signal therefrom, means connected to the output of said 3F/10 frequency signal generating means for passing and amplifying the 3F/10 frequency signal generated thereby, means coupled to the output of said 3F/10 frequency signal passing and amplifying means for generating a 9F/10 frequency signal therefrom, means interconnecting the output of said 9F/10 frequency signal generating means and the other input of each of said first and third signal mixing means for passing an amplified 9F/10 frequency signal thereto simultaneously, means coupled to the output of said second signal mixing means for filtering the 11F/10 frequency signal emanating therefrom, and means connected to the output of said third signal mixing means for filtering the 8F/10 frequency signals emanating therefrom.

4. The device of claim 1 wherein said means connected to said F/10 frequency signal producing means for heterdyning an input S frequency signal with said F/10 frequency signal for producing an F/10+S frequency signal comprises, a balanced modulator, and an upper sideband filter connected to the output of said balanced modulator.

5. The device of claim 1 wherein the means effectively coupled to said last mentioned heterodyning means and said 11F/10 frequency signal producing means for producing an F−S frequency signal comprises, a mixer, and a lower sideband filter.

6. The device of claim 1 wherein said means effectively coupled to said F−S frequency signal producing means and said 9F/10 frequency signal generating means for producing an F−S/10 frequency signal comprises, a divider by ten, a mixer coupled to said divider by ten, and an upper sideband filter coupled to the output of said mixer.

7. The device of claim 1 wherein said means effectively connected to said F/10−S/500 frequency signal producing means and the aforementioned F/10+S frequency signal producing means for producing an S+S/500 frequency signal comprises, a mixer, and a lower sideband filter connected to the output of said mixer.

8. Means for up-Dopplerizing an S input signal into an S+S/500 output signal comprising in combination, means for generating a signal having a predetermined F/10 frequency, means for generating a signal having a predetermined 8F/10 frequency, means for generating a signal having a predetermined 9F/10 frequency, means for generating a signal having a predetermined 11F/10 frequency, means for receiving an input signal having an S frequency, and means appropriately coupled to each of said F/10, 8F/10, 9F/10, and 11F/10 frequency signal generating means and the aforesaid S frequency signal receiving means for producing an output signal in accordance with the following mathematical derivation:

$$\frac{F}{10} + S = \frac{F}{10} + \frac{10S}{10} = \frac{F + 10S}{10}$$

$$\frac{11F}{10} - \frac{F + 10S}{10} = F - S$$

$$F - S \div 10 = \frac{F}{10} - \frac{S}{10}$$

$$\frac{F}{10} - \frac{S}{10} + \frac{9F}{10} = F - \frac{S}{10}$$

$$F - \frac{S}{10} \div 5 = \frac{2F}{10} - \frac{S}{50}$$

$$\frac{2F}{10} - \frac{S}{50} + \frac{8F}{10} = F - \frac{S}{50}$$

$$F - \frac{S}{50} \div 10 = \frac{F}{10} - \frac{S}{500}$$

$$\frac{F}{10} + S - \left(\frac{F}{10} - \frac{S}{500}\right) = S + \frac{S}{500}.$$

9. A Doppler signal simulator comprising in combination, means for generating a plurality of control signals having F, F/10, 8F/10, 9F/10, and 11F/10 frequencies respectively, means for receiving an input signal having an S frequency, a modulator having a pair of inputs and an output with one of the inputs thereof coupled to said receiving means for response to said S frequency input signal and the other input thereof coupled to the output of the aforesaid F/10 frequency signal generating means, a first mixer having a pair of inputs and an output with one of the inputs thereof effectively coupled to the output of said modulator and the other input thereof effectively coupled to the output of the aforesaid 11F/10 frequency signal generating means, a first divider effectively coupled to the output of said first mixer, a second mixer having a pair of inputs and an output with one of the inputs thereof effectively coupled to the output of said first divider and the other input thereof coupled to the output of the aforesaid 9F/10 frequency signal generating means, a second divider effectively coupled to the output of said second mixer, a third mixer having a pair of inputs and an output with one of the inputs thereof coupled to the output of said second divider and the other input thereof coupled to the output of the aforesaid 8F/10 frequency signal generating means, a third divider effectively coupled to the output of said third mixer, and a fourth mixer having a pair of inputs and an output with one of the inputs thereof effectively coupled to the output of said third divider and the other input thereof effectively coupled to the output of the aforesaid modulator.

10. Means for generating a plurality of predetermined control signals comprising in combination, means for producing an output signal having a frequency F, first means having a pair of inputs and an output for mixing a pair of signals with one of the inputs thereof coupled to the output of said F frequency signal producing means, second means having a pair of inputs and an output for mixing a pair of signals with one of the inputs thereof coupled to the output of said first signal mixing means and the other input thereof coupled to the output of the aforesaid F frequency signal producing means, third means having a pair of inputs and an output for mixing a pair of signals with one of the inputs thereof coupled to the output of said first signal mixing means, means connected to the output of said first signal mixing means for passing and amplifying the F/10 signals emanating therefrom, means coupled to the output of said F/10 signal passing and amplifying means for generating a 3F/10 frequency signal therefrom, means connected to the output of said 3F/10 frequency signal generating means for passing and amplifying the 3F/10 frequency signal generated thereby, means coupled to the output of said 3F/10 frequency signal passing and amplifying means for generating a 9F/10 frequency signal therefrom, means interconnecting the output of said 9F/10 frequency signal generating means and the other input of each of said first and third signal mixing means for passing an amplified 9F/10 frequency thereto simultaneously, means coupled to the output of said second signal mixing means for filtering the 11F/10 frequency signal emanating therefrom, and means connected to the output of said third signal mixing means for filtering the 8F/10 frequency signals emanating therefrom.

11. Means for generating predetermined control signals comprising in combination, an oscillator having an F frequency signal output, a first mixer having a pair of inputs and an output with one of the inputs thereof coupled to the output of said oscillator, a second mixer having a pair of inputs and an output with one of the inputs thereof coupled to the output of said oscillator and the other input thereof coupled to the output of said first mixer, an 11F/10 frequency signal filter connected to the output of said second mixer, a third mixer having a pair of inputs and an output with one of the inputs thereof coupled to the output of said first mixer, an 8F/10 frequency signal filter coupled to the output of said third signal mixer, an F/10 frequency tuned amplifier coupled to the output of said first signal mixer, a 3F/10 frequency harmonic generator connected to the output of said F/10 frequency tuned amplifier, a 3F/10 frequency tuned amplifier coupled to the output of said 3F/10 harmonic generator, a 9F/10 frequency generator coupled to the output of said 3F/10 frequency tuned amplifier, and a 9F/10 frequency tuned amplifier interconnecting the output of said 9F/10 frequency generator and the other inputs of each of said first and third signal mixers.

12. The invention according to claim 11 further characterized by a buffer amplifier coupled to the output of said 11F/10 frequency signal filter.

13. In a Doppler signal simulator, means for generating predetermined control signals comprising in combination, an oscillator having an F frequency signal output, a first mixer having a pair of inputs and an output with one of the inputs thereof coupled to the output of said oscillator, a second mixer having a pair of inputs and an output with one of the inputs thereof coupled to the output of said oscillator and the other input thereof coupled to the output of said first mixer, an 11F/10 frequency signal filter connected to the output of said second mixer, a third mixer having a pair of inputs and an output with one of the inputs thereof coupled to the output of said first mixer, an 8F/10 frequency signal filter coupled to the output of said third signal mixer, an F/10 frequency tuned amplifier coupled to the output of said first signal mixer, a 3F/10 frequency harmonic generator connected to the output of said F/10 frequency tuned amplifier, a 3F/10 frequency tuned amplifier coupled to the output of said 3F/10 harmonic generator, a 9F/10 frequency harmonic generator coupled to the output of said 3F/10 frequency tuned amplifier, and a 9F/10 frequency tuned amplifier interconnecting the output of said 9F/10 frequency generator and the other inputs of each of said first and third signal mixers.

14. A Doppler signal simulator comprising in combination, means for receiving an input signal a balanced modulator having a pair of inputs and an output with one of the inputs thereof connected to said input signal receiving means, a first upper sideband filter connected to the output of said balanced modulator, means coupled to said first upper sideband filter for shaping the output therefrom, a first mixer having a pair of inputs and an output with one of the inputs thereof coupled to the output of said shaping means, a first lower sideband filter connected to the output of said first mixer, a first divider coupled to the output of first lower sideband filter, a second mixer having a pair of inputs and an output with one of the inputs thereof coupled to the output of said first divider, a second upper sideband filter coupled to the output of said second mixer, a second divider coupled to the output of said second upper sideband filter, a third mixer having a pair of inputs and an output with one of the inputs thereof connected to the output of said second divider, a third upper sideband filter coupled to the output of said third mixer, a third divider coupled to the output of said third upper sideband filter, a fourth mixer having a pair of inputs and an output with one of the inputs thereof effectively coupled to the output of said third divider, means connected between said first upper sideband filter and the other input of said fourth mixer for supplying the output thereof thereto, a second lower sideband filter coupled to the output of said fourth mixer, means coupled to the other input of said balanced modulator for supplying a predetermined F/10 frequency signal thereto, means coupled to the other input of said first mixer for supplying a predetermined 11F/10 frequency signal thereto, means coupled to the other input of said second mixer for supplying a predetermined 9F/10 frequency signal thereto, and means coupled to the other input of said third mixer for supplying a predetermined 8F/10 frequency signal thereto.

15. The device of claim 14 wherein said first divider is a divide by ten divider.

16. The device of claim 14 wherein said second divider is a divide by five divider.

17. The device of claim 14 wherein said third divider is a divide by ten divider.

18. The invention according to claim 14 further characterized by a buffer amplifier interposed between the output of said third divider and said one input of the aforesaid fourth mixer.

19. The invention according to claim 14 further characterized by a buffer amplifier interposed between the output of said first upper sideband filter and said other input of the aforesaid fourth mixer.

* * * * *